H. A. BARNARD.

FLOUR-PACKER.

No. 7,086. Reissued May 2, 1876.

WITNESSES

F. L. Ourand

H. N. Miller

INVENTOR

H. A. Barnard

By T. H. Alexander

Attorney.

N. PETERS, PHOTO-LITHOGRAPHER, WASHINGTON, D. C.

UNITED STATES PATENT OFFICE.

HEMAN A. BARNARD, OF MOLINE, ILLINOIS, ASSIGNOR TO THE BARNARD & LEAS MANUFACTURING COMPANY.

IMPROVEMENT IN FLOUR-PACKERS.

Specification forming part of Letters Patent No. 173,882, dated February 22, 1876; reissue No. 7,086, dated May 2, 1876; application filed April 15, 1876.

*To all whom it may concern:*

Be it known that I, HEMAN A. BARNARD, of Moline, in the county of Rock Island and State of Illinois, have invented certain new and useful Improvements in Flour-Packers; and I do hereby declare that the following is a full, clear, and exact description thereof, reference being had to the accompanying drawings, and to the letters of reference marked thereon, which form a part of this specification.

The nature of my invention consists in the construction and arrangement of a flour-packer, as will be hereinafter more fully set forth.

In order to enable others skilled in the art to which my invention appertains to make and use the same, I will now proceed to describe its construction and operation, referring to the annexed drawing, in which—

Figure 1:
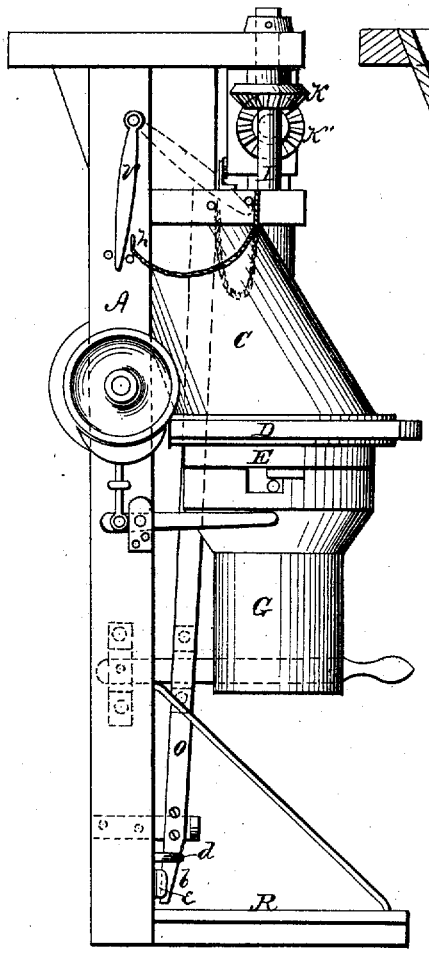
Figure 2:
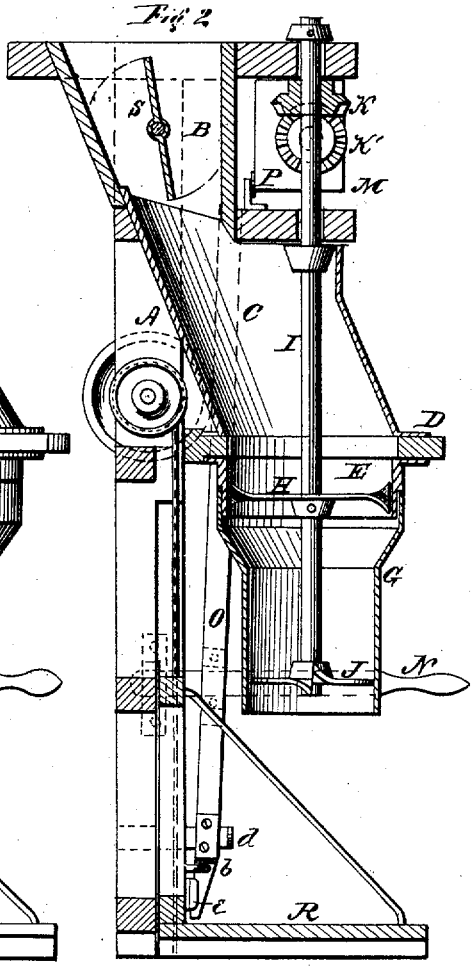
Figure 3:
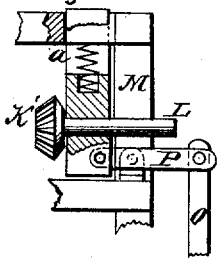

Figure 1 is a side elevation of my flour-packer. Fig. 2 is a longitudinal section of the same. Fig. 3 is a detailed view.

A represents a suitable frame-work, with a spout, B, at the top, to connect under the bin in which the flour is kept for packing. To the lower end of the spout B is attached an inclined conductor, C, the lower end of which is fastened to a plate, D, secured to the frame A, and provided with a central orifice of the same or larger diameter than that of the conductor. On the under side of this plate is attached a wide cast-iron ring, E, forming a circular chamber immediately under the conductor or throat C, and above the stationary tube G, which latter is fastened to the lower end of the chamber. The chamber E is large enough to receive the upper auger H, secured on the vertical shaft I, and this auger being in the chamber above the tube, it holds the flour in the machine and the bin above it from running out while the tubes are being changed from barrels to sacks, and vice versa.

In this class of machines an auger has usually been placed in the throat, but that has been found not to work satisfactorily, as it will not retain the flour above it, and for other reasons; but by supplying a distinct and separate chamber for the auger to work in, the machine is rendered effective and useful.

On the shaft I is secured another auger, J, working in the end of the tube G. The shaft I is provided with a miter-pinion, K, which is to mesh with a similar pinion, K′, on a horizontal shaft, L. This shaft L has its bearing in a vertically-sliding bar, M, which is pressed downward by a spring, *a*, to keep the pinions out of gear. They are thrown in gear by a lever, N, connected by a rod, O, attached to one end of a lever, P, the other end of said lever being pivoted to the bar M, and the pinions are held in gear by a hook, *b*, on the lower end of the rod O catching on a pin, *d*, in the frame. R is the sliding platform, on which the barrel or sack is placed, which platform descends as the flour is being packed in the barrel or sack thereon. When the sack is full a projection, *e*, on the platform releases the hook *b*, allowing the spring at once to throw the pinions out of gear and stop the operation of the packer. In the top or spout B of the machine is a butterfly-valve, S, pivoted as shown, and held open or closed by means of a lever, V, and pin *h*. This valve is to hold the flour in the bin above while the tubes are being changed. This valve may be slotted, so as to allow the flour to pass through the openings, and not pack it so hard against the sides of the machine, where it is liable to stick when the valve is opened, and thus prevent the flour from coming down when wanted.

Having thus fully described my invention, what I claim as new, and desire to secure by Letters Patent, is—

1. The combination, with the throat C, of the stationary and detachable packing-chambers E G, each provided with a packing-screw, as shown, and for the purposes set forth.

2. The combination of the spring *a* with the sliding bar M, fulcrum-lever P, rod O, and hand-lever N, substantially as and for the purposes herein set forth.

In testimony that I claim the foregoing as my own I affix my signature in presence of two witnesses.

HEMAN A. BARNARD.

Witnesses:

ELSWORTH MAPES,

C. F. WORTMAN.